United States Patent [19]

Yamazaki et al.

[11] Patent Number: 4,993,815
[45] Date of Patent: Feb. 19, 1991

[54] ZOOM-LENS-BARREL ASSEMBLY

[75] Inventors: Yasuo Yamazaki; Kazutoshi Shiratori, both of Hino, Japan

[73] Assignee: Olympus Optical Co., Ltd., Japan

[21] Appl. No.: 480,282

[22] Filed: Feb. 15, 1990

[30] Foreign Application Priority Data

Feb. 21, 1989 [JP] Japan .................................. 1-42189

[51] Int. Cl.$^5$ ............................................. G02B 15/00
[52] U.S. Cl. ..................... 350/429; 350/255; 354/195.12
[58] Field of Search ........................ 350/429, 430, 255; 354/400, 195.1, 195.12, 272, 271.1

[56] References Cited

U.S. PATENT DOCUMENTS

| 4,634,221 | 1/1987 | Höpfner | 350/255 |
| 4,729,644 | 3/1988 | Ueyama | 350/429 |
| 4,750,821 | 6/1988 | Yamamoto et al. | 350/429 |
| 4,834,514 | 5/1989 | Atsuta et al. | 350/429 |
| 4,950,060 | 8/1990 | Nagasaka | 350/429 |

FOREIGN PATENT DOCUMENTS

| 39-15721 | 8/1964 | Japan . |
| 59-148012 | 8/1984 | Japan . |
| 62-201710 | 12/1987 | Japan . |

Primary Examiner—Bruce Y. Arnold
Assistant Examiner—Loha Ben
Attorney, Agent, or Firm—Louis Weinstein

[57] ABSTRACT

A zoom lens-barrel assembly includes a differential cam frame which is moved in an axial direction together with a movable barrel and is rotated around an optical axis. Lens holding frames are cam-linked with the differential cam frame. The positions of the lens holding frames relative to the cam frame are changed by the rotation of the cam frame.

33 Claims, 5 Drawing Sheets

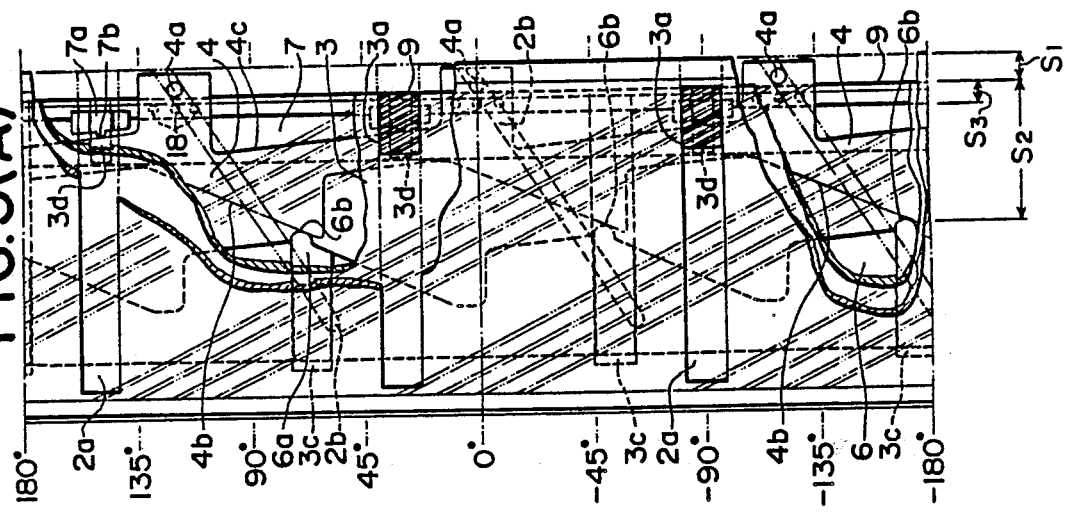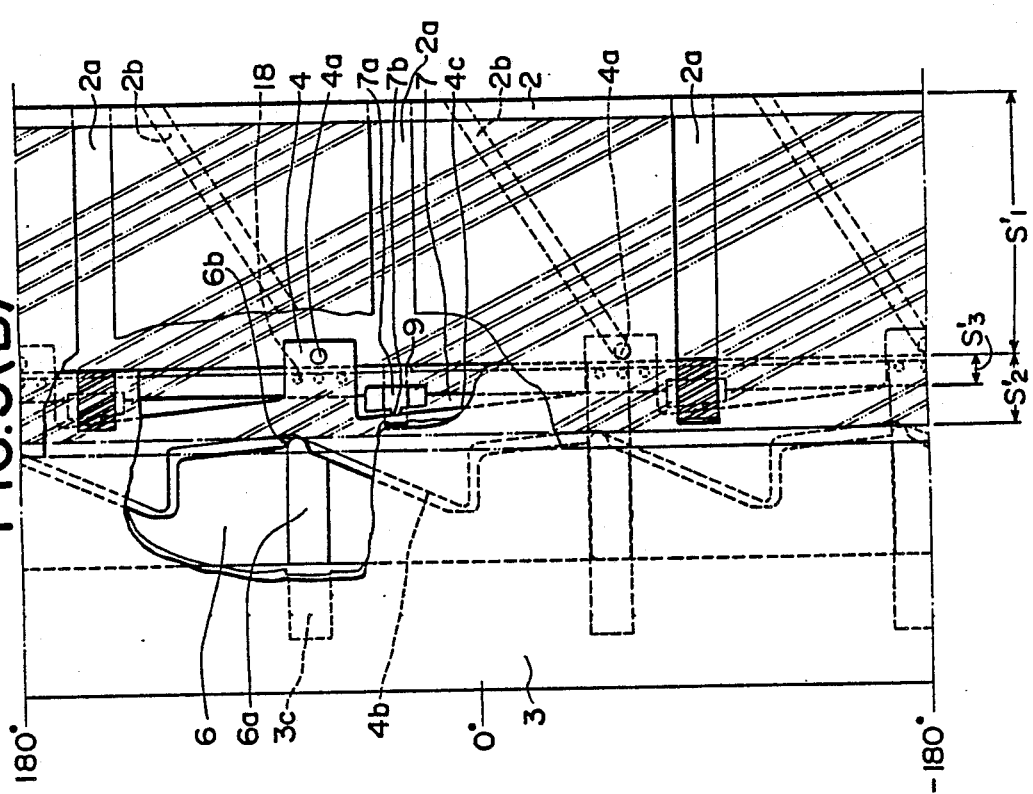

ZOOM-LENS-BARREL ASSEMBLY

BACKGROUND OF THE INVENTION

The present invention relates to a zoom lens-barrel assembly, and in particular to a zoom lens-barrel assembly having more than two lens groups.

Recently, various mechanisms for driving a zoom lens have been proposed in connection with the automatization of camera. For example, Japanese Patent Publication Sho/39-15721 discloses a lens barrel having a zoom lens driving mechanism which is a combination of a helicoid screw and a differential cam. Japanese Laid-Open Patent Application No. 59-148012 discloses a zoom lens assembly which is adapted to drive a zoom lens by cam-linking first and second zoom lens holding frames with each other. Japanese Laid-Open Utility Model Application Sho/62-201710 discloses a lens driving mechanism in which a cam slot for driving a lens is provided by biasing first and second cam members to an engaging pin in a barrel. A mechanism for driving a lens frame in a barrel which was proposed in pending Japanese Patent Application Sho/63-33029 filed by the present assignee is of a cam ring type.

Driving a number of lens holding frames by using the afore-mentioned lens driving mechanism of a barrel offers disadvantages such as complicated structure an the problem of molding due to rigidity.

For example, a barrel mechanism for a variable focal point lens disclosed in Japanese Patent Publication No. Sho/39-15721 differentially moves two lens frames. Application of this mechanism to driving of more than two lens frame groups increases the number of components and provides a very complicated structure.

As mentioned above, the lens driving mechanism disclosed in Japanese Patent Application Sho/63-33029 is of the cam ring type. The structure of this mechanism will be described by way of a set of lens frame driving mechanism shown in FIG. 6. A driving barrel 41 has tilted cam slots 41a equally spaced on the outer periphery thereof. A lens holding frame 42 is fitted into the driving barrel 41. The lens holding frame 42 has engaging pins 42a which are fitted in the cam slots 41a. In the thus formed driving mechanism, rotation of the driving barrel 41 causes the lens holding frame 42 to be selectively moved forwardly and rearwardly in an axial direction, so that the lens is moved for zooming. However the cam barrel of this structure requires a high precision. If the cam barrel is made of a plastic material, the cam barrel will deform due to an insufficient rigidity when the driving barrel is subject to an external force so that intended precision cannot be assured. Accordingly, molding of these barrel is impossible. One lens holding frame is driven by three engaging pins. Assuming that the driving mechanism be used for driving three lens groups, a total of nine engaging pins should be screwed into the frame. Accordingly, it is difficult to assemble a zoom lens-barrel assembly having such a driving mechanism.

SUMMARY OF THE INVENTION

It is an object of the present invention to provide a lens-barrel assembly having a simple structure, which is readily assembled and provides a sufficient rigidity to components even when they are molded and is preferable for zooming a photographic area from wide to telephoto extremities.

In an aspect of the present invention, there is provided a zoom lens-barrel assembly which performs zooming operation by selectively moving forwardly and rearwardly a plurality of lens groups in a direction of an optical axis, comprising: a stationary frame to be mounted on a camera; a movable frame which is moved in a direction of the optical axis relative to said stationary frame by zooming operation; a cam frame which is cam linked with said stationary frame and may be rotated around the optical axis by being moved in the optical axis direction together with said movable frame; said cam frame having one circumferential cam at front and rear portions thereof respectively; first and second driven frames which are held by said movable frame so that they are movable along the optical axis and cannot be rotated around the optical axis, the positions of said first and second driven frames with respect to said movable frame along the optical axis being determined by engaging with the cams at the front and rear portions of said cam frame, respectively; and a plurality of lens groups which are held by said movable frame and first and second driven frames.

The zoom lens-barrel assembly of the present invention includes a differential cam frame which is moved in an axial direction together with the movable barrel. The positions of a plurality of lens holding frames such as second and third lens groups may be determined by the cam faces provided on the front and rear end faces of the differential cam.

In another aspect of the present invention, there is provided a zoom lens-barrel assembly which performs zooming operation by selectively moving forwardly and rearwardly a plurality of lens groups in a direction of an optical axis comprising: a stationary frame to be mounted on a camera; a movable frame which is moved in a direction of the optical axis relative to said stationary frame by zooming operation; a cam frame which is cam linked with said stationary frame and may be rotated around the optical axis by being moved in the optical axis direction together with said movable frame: said cam frame having two circumferential cams and one circumferential cam at front and rear portions thereof respectively; first and second and third driven frames which are held by said movable frame so that they are movable along the optical axis and cannot be rotated around the optical axis, the positions of said first and second driven frames relative to said movable frame in the direction of the optical axis being determined by engaging with the front and rear cams of said cam frame, respectively, and a plurality of lens groups which are held by said movable frames and said driven frames, respectively.

The present invention provides a zoom lens-barrel assembly having a number of advantages including the following.

(i) A zoom lens-barrel assembly having a structure more simple than conventional cam ring type lens-barrel assembly is provided particularly to a multi-lens group assembly.

(ii) Accordingly, positional precision of the lens is improved. The assembly is simplified and the performance of the lens is stabilized.

(iii) The movement of the inner lens groups performed by cam driving and displacing of the barrel relies upon a helicoid screw. Accordingly, the endurance of the barrel against an abnormal external force is sufficient.

(iv) Since each of the components is simple in shape, molding of them is easy.

(v) Low cost manufacturing is possible.

BRIEF DESCRIPTION OF THE DRAWINGS

FIG. 3A and FIG. 3B are developed views of main components of the zoom lens assembly which is at wide and telephoto extremities, respectively.

DETAILED DESCRIPTION OF THE INVENTION

The present invention will be described with reference to the drawings.

Figure 1:
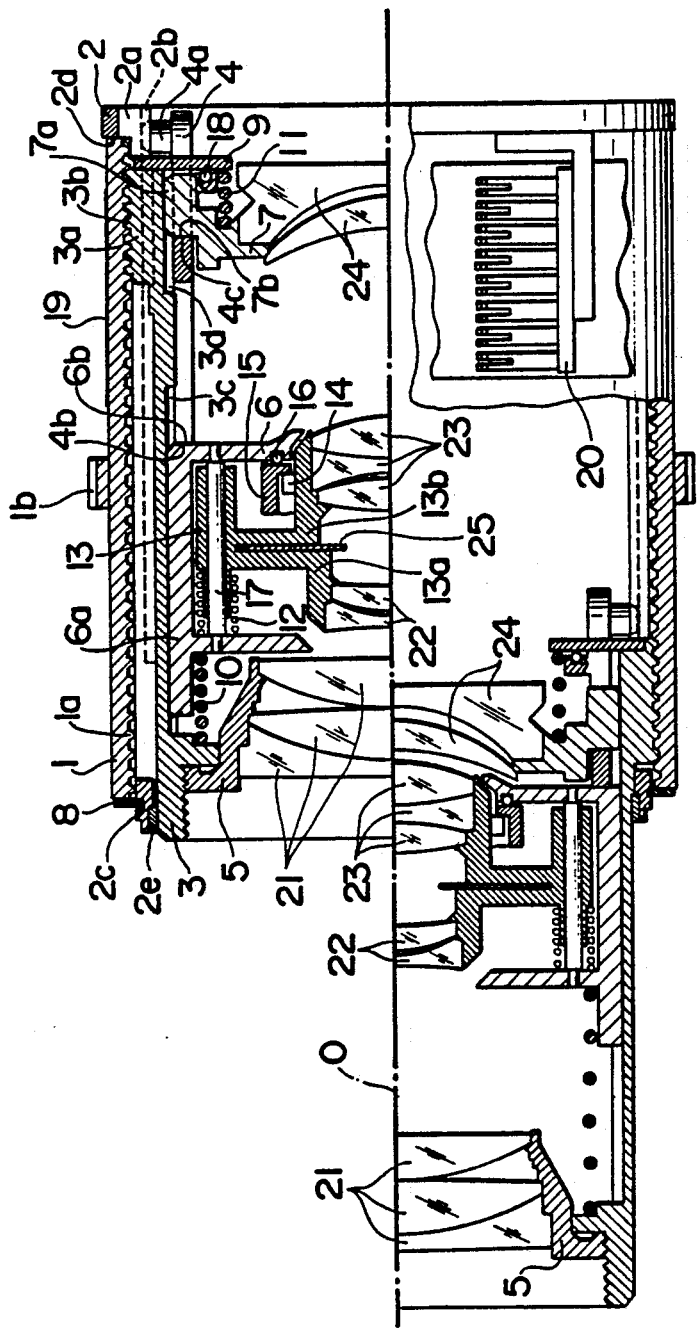
FIG. 1 is a longitudinal sectional view showing a first embodiment of a zoom lens assembly of the present invention, which is shown at wide and telephoto extremities.

Referring now to FIG. 1, a longitudinal cross section shows a first embodiment of a zoom lens assembly of the present invention. The assembly includes a triplet lens group inner focus type zoom lens. Upper and lower halves of FIG. 1 show the zoom lens which is at wide and tele extremities, respectively. The zoom lens has an optical axis which is represented by a reference O. The lens assembly includes as main components a zoom ring 1, a stationary frame 2 to be secured to an optical device such as a camera, and a movable frame assembly. The ring 1 and the frame 2 and the movable frame assembly are concentric with the optical axis O.

The zoom ring 1 is made of a cylinder and has a zooming transmission gear 1b which is driven by a zooming motor driving unit (not shown) provided at the midpoint of the outer periphery of the cylinder. The ring 1 is formed with a helicoid screw 1a at the inner periphery thereof. A flexible printed wiring board 19 is arranged on and secured to the outer periphery at the end (mount side) of the ring 1. The board 19 is printed with an encoding pattern for an encoder (not shown). The zoom position of the zoom lens is read out on zooming by means of encoder contacts 20 supported by the stationary frame 2, which are in contact with the encoder pattern. so that the contacts provide zoom position information to a CPU.

The stationary frame 2 is provided with three straight guide grooves or slots 2a which open at the mount side end thereof and three spiral cam grooves or slots 2b having a bottom disposed between the straight guide grooves 2a. Each of guides 3a of the movable frame 3 (which will be described hereafter) is adapted to fit into a corresponding straight groove 2a. Each of driving pins 4a of a differential cam 4 which will be described hereafter is adapted to fit into the corresponding cam groove 2b so that it will be spirally guided. The zoom ring 1 is fitted on the outer periphery of the stationary frame 2 in a concentric manner and is rotatable with respect to the stationary frame 2. Helicoid screw 3b at the outer end of the straight guide 3a of the movable frame 3 extending through the straight guide groove 2a of the stationary frame 2 is threaded with the helicoid screw 1a of the zoom ring 1.

The axial movement of the zoom ring 1 toward the rear end is restricted by abutting the mount side end of the ring against the flange 2d of the stationary frame 2. The axial movement of the zoom ring toward the front end thereof is restricted by abutting the front end of the ring 1 against the stopper plate ring 8 adapted to fit into the groove 2c formed around the outer periphery of frame 2.

The structure of the movable frame assembly will be described in more detail. The movable frame assembly comprises a cylindrical frame 3 which is slidably fitted in the stationary frame 2, a first lens holding frame 5 screwed into the front portion of the movable frame 3, a first lens group 21 firmly secured to the holding frame 5, a second lens holding frame 6 (driven frame) which is slidably inserted into the interior of the movable frame 3 and which slidably supports second lens group holding frame 13 by means of a focussing shaft 17, second front and rear lens groups 22 and 23, respectively supported on the front and rear frame portions 13a and 13b of the second lens group holding frame 13; a differential cam 4 (cam frames) interposed between the second lens holding frame 6 and a third lens holding frame 7 which will be described hereafter, said differential cam being rotatably fitted into the movable frame 3 from the mount side; the third lens holding frame 7 (driven frame) fitted in the movable frame 3 from the mount side; a third lens group 24 held in the third lens holding frame 7; and a cam stopper plate 9 secured to the end face of the movable frame 2.

Figure 2:
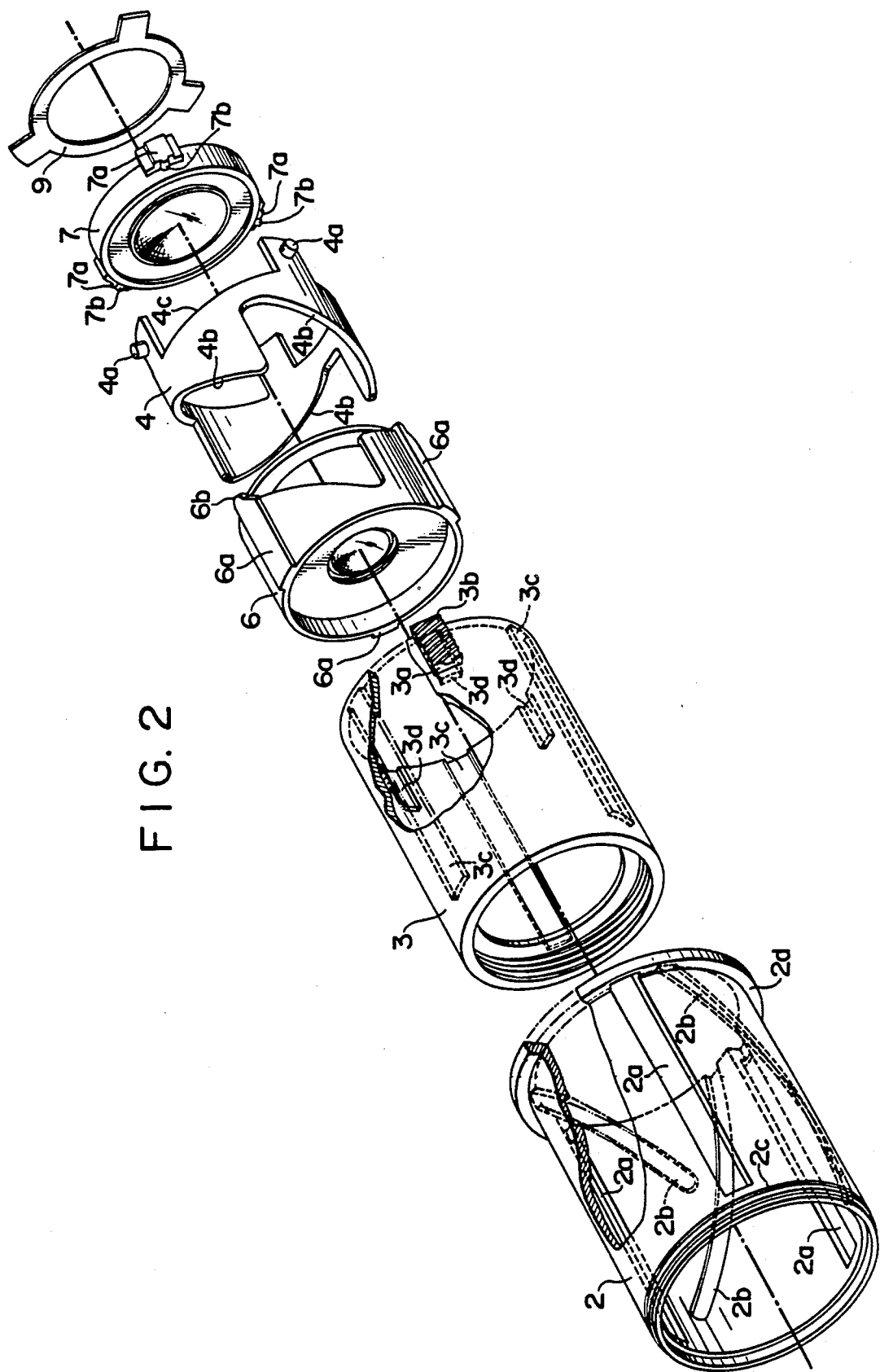
FIG. 2 is an exploded perspective view showing the main components of the zoom lens shown in FIG. 1.

The configuration and the order of combination of the components of the movable frame assembly will be described in more detail with reference to FIGS. 1 and 2. The movable frame 3 has projecting straight guides 3a on the outer periphery of the mount side at the three positions, preferably equally spaced angular positions which guides are each slidably fitted in a corresponding linear groove 2a of the stationary frame 2. Each of the guides 3a is provided with the helicoid screw 3b meshed with the helicoid screw 1a of the zoom ring 1 at the outer periphery of the guide 3a. Accordingly, rotation of the zoom ring 1 causes the movable frame 3 to be guided and slid along the linear groove 2a of the stationary frame 2 in an optional axial direction. The movable frame is formed with linear guide grooves 3c on the inner periphery thereof at three angularly spaced positions for linearly guiding the second lens holding frame 6 along the optical axis 0 at angularly spaced positions on the inner periphery thereof and is also formed with three linear guide grooves 3d arranged between the grooves 3c on the inner periphery of the frame 3 for linearly guiding the third lens holding frame 7 along the optical axis 0. Both guide grooves 3c and 3d open at the mount side thereof.

The second lens holding frame 6 which is slidably fitted in the inner periphery of the movable frame is formed with convexed linear guides 6a fitted to slide in the linear guide grooves 3c of the movable frame 3 on the outer periphery thereof at the three angular positions. The second lens holding frame 6 is also formed at three angular positions with differential cam abutting portions 6b which each abut upon an associated cam face 4b of the differential cam 4 at the mount side end thereof and a second holding frame spring 10 of a compression spring type is disposed between the front wall of the movable frame 3 and the second lens holding frame 6. Since the second lens holding frame 6 is biased toward the mount side by means of the second holding frame spring 10, the second lens holding frame 6 is normally in pressure contact with the front cam face 4b of the differential cam 4. Thus, the second lens holding frame 6 will be moved in an axial direction in accordance with the cam contour.

The differential cam 4 which is rotatably fitted in the movable frame 3 is provided with front and rear cam faces 4b and 4c at the front and rear ends thereof. The front and rear cam faces 4b and 4c are complementary to the rear and front ends of the second and third lens holding frames 6 and 7, respectively. The cam abutments 6b of the second lens holding frame 6 abut on the front cam face 4b of the differential cam 4 and the cam abutments 7b of the third lens holding frame 7 abut and slides on the rear cam face 4c of the differential cam 4. The cam ring 4 is formed with three extensions projecting beyond cam faces 4c. The extensions extend toward the mount side. Driving pins 4a which are respectively fitted in one of the spiral cam grooves 2b of the stationary frame 2, are secured on the outer periphery of each extension. The extensions are disposed so that they will not move into a moving range of the guide 7a of the third lens holding frame 7 which will be described hereafter (refer to FIG. 3). The differential cam 4 may be provided with a projection 4d, on the inner periphery of respective extensions opposite to the driving pin 4a (note FIG. 5). The projection is provided with a groove having a V-shaped groove at the end face of mount side. A differential cam ball 18 which may abut on the inner face of the cam stopper plate 9 secured to the movable frame 3 is disposed in the V-shaped groove. The third lens holding frame 7 which is slidably fitted in the inside of the differential cam 4 is provided on the outer periphery thereof with three convexed linear guides 7a fitted in the linear guide groove 3d of the movable frame 3. A differential cam abutment 7b which abuts on the associated cam face 4c of the differential cam disposed at the mount side thereof projects from the front end face of the respective guide 7a. Since the third lens holding driven frame 7 is biased forwardly, that is, in a direction to the differential cam 4 by means of a compression spring 11 disposed between the cam stopper plate 9 secured to the movable frame 3 and the holding driven frame 7, the cam abutment portion 7b abuts upon and follows the cam face 4c of the differential cam 4 so that the third lens holding driven frame 7 will move in an axial direction.

The differential cam 4 is biased in a direction toward the mount via the second lens holding frame 6 by the second holding frame spring 10 and on the other hand, the cam 4 is forwardly biased via the third lens holding driven frame 7 by means of the third holding frame spring 11 as mentioned above. The springs are preset so that the biasing force of the second holding frame spring 10 is stronger than that of the third holding frame spring 11, the differential cam 4 is biased in a direction toward the mount and a condition that the cam ball 18 abuts upon the cam stopper plate 9 is maintained. Accordingly, when the movable frame 3 is moved forwardly by the rotation of the zoom ring 1, the differential cam 4 follows the spiral groove 2b of the stationary frame 2, so that rotation of the cam 4 causes the cam 4 to be forwardly moved together with the movable frame 3.

A drive portion for focussing the second lens group holding frame 13 will be described. The second lens group holding frame 13 slidably supported on a focussing shaft 17 of the second lens holding driven frame 6 includes sectors 25 of an aperture or shutter disposed between the front and rear frames 13a and 13b serving as a lens holder. A focussing pin 14 is secured to the outer periphery of the rear frame 13b of the second lens group holding frame 13. A focussing cam 15 which abuts on the pin 14 is rotated around the optical axis 0 by means of a focussing driving device (not shown) under a condition that the cam 15 abuts on a focussing cam ball 16 fitted in the circumferential groove formed on the inner side of the rear wall of the second lens holding driven frame 6. The second lens group holding frame 13 is moved in an axial direction against the axial biasing force exerted by a focussing spring 12 so that the second front and rear lens groups 22 and 23 held on the second lens group holding frame 13 are focussed.

After the movable frame 3 has been inserted into the stationary frame 2 from the mount side, a ring 2e for supporting the outer periphery of the movable frame 3 is secured to the inner periphery of the front end portion of the stationary frame 2. This ring 2e serves as a stopper for preventing the movable frame 3 from moving beyond the telephoto extremity.

The operation of the zoom lens assembly of the present embodiment will be described with reference to FIGS. 3A and 3B. FIGS. 3A and 3B are developing views showing a lens assembly in which a zoom ring 1 is moved at wide and telephoto extremities, respectively. In FIGS. 3A and 3B, references S1 and S1' depict distances between the mount side end face of the stationary frame 2 and the mount side end face of the movable frame 3 which are wide and telephoto extremities, respectively. References S2 and S2' depict the relative distance between the mount side end face of the movable frame 2 and the mount side end face of the second lens holding frame 6 which are wide and telephoto extremities, respectively: References S3 and S3' depict the relative distance between the mount side end face of the movable frame 3 and the mount side end face of the third lens group holding driven frame 7 which are at wide and telephoto extremities, respectively.

As the zoom ring 1, rotates from a position at which the lens-barrel assembly is at the wide position, the movable frame 3 is linearly moved toward a telephoto extremity by means of the helicoid screw while the guide 3a is guided by the linear guide groove 2a of the stationary frame 2 and the distance S1 increases. Simultaneously with this, the differential cam 4 is cam stopper plate 9 secured to the stationary frame 2, and is moved in a direction toward a telephoto extremity together with the movable frame 3. Since the driver pin 4a are guided by the cam grooves 2b of the stationary frame 2 simultaneously, the differential cam 4 rotates around the optical axis. On the other hand, the second lens holding driven frame 6 and the third lens holding frame 7 are linearly moved by the fact that respective guides 6a and 7a are guided along the linear guide grooves 3c and 3d of the movable frame 3. However the cam abutments 6b and 7b of the first and third lens holding driven frames 6 and 7 abut on the cam faces 4b and 4c of the differential cam 4, respectively, and they follow the cam faces 4b and 4c. Accordingly, the second lens holding driven frame 6 moves in a direction to the mount side with respect to the movable frame 3 and the third lens holding driven frame 7 moves in a front direction on rotation of the differential cam 4. That is, the distance S2 decreases while the distance S3 increases. When rotation of the zoom ring 1 causes the lens-barrel assembly to reach the telephoto position as shown in FIG. 3b, the movable frame 3 reaches a position of the afore-mentioned distance S'1 and the relative positions of the second and third lens holding driven frames 6 and 7 with respect to the movable frame 3 provide the distances S2' and S3' in accordance with a zoom value. In the present embodiment, the relative position changes to provide the relations S'2 < S2 and S'3 > S3. Numerical values on the ordinate represent a rotational angle of the differential cam 4. The position of the driving pin 4a of the differential cam 4 is preset as 0 at the wide extremity. In the present embodiment, the differential cam 4 rotates about 60° between wide and telephoto extremities.

The assembly exhibits a movement reversal to that mentioned above and smooth zooming may be performed When the assembly changes from the telephoto to wide extremities.

Figure 4:
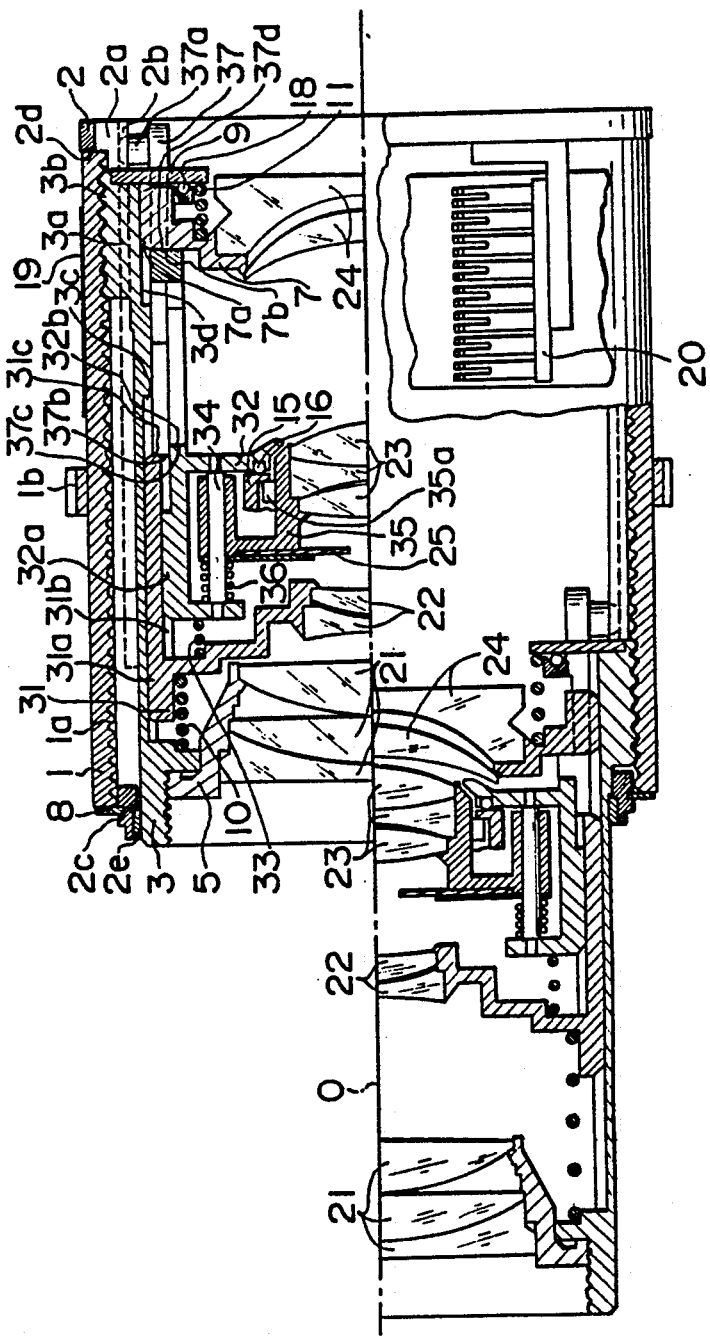
FIG. 4 is a longitudinal sectional view showing a second embodiment of a zoom lens assembly of the present invention, which is at wide and telephoto extremities.
Figure 5:
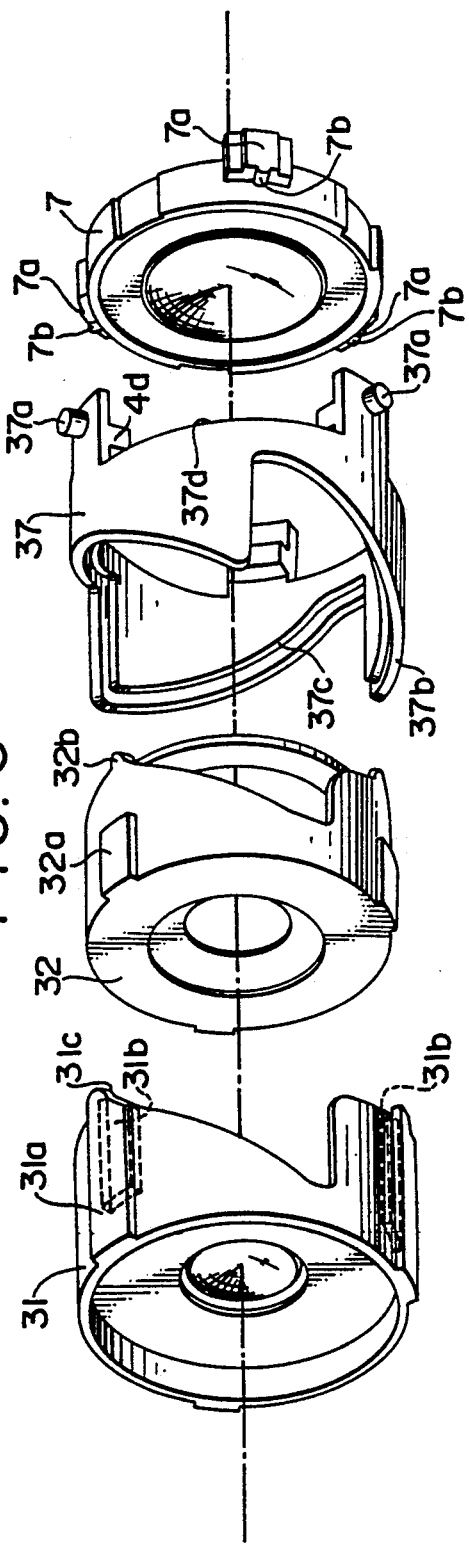
FIG. 5 is an exploded perspective view of a lens holding frame and a differential cam of the zoom lens assembly of FIG. 4.
Figure 6:
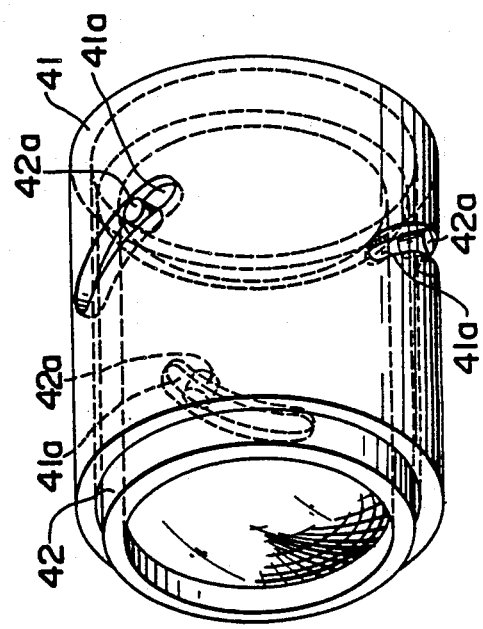
FIG. 6 is a perspective view for explaining the structure of a prior art cam ring type assembly.

The second embodiment of the zoom lens-barrel assembly of the present invention will be described with reference to FIGS. 4 and 5 in which like numerals depict like components through FIGS. 1 to 3. Although the second front and rear lens groups 22 and 23 are integrally supported by the second lens holding driven frame 6 in the first embodiment, they are divided into two parts and may be moved separately from each other. For clarity Of description, description of the Same components will be omitted and only different components will now be described. The second front lens group 22 is held by a second front lens group holding frame 31 and the second rear lens group 23 is held by a second rear lens group holding frame 35. The second rear lens group holding frame 35 is slidably supported on the focussing shaft 34 secured to the second rear lens group holding frame 32. The second front lens group holding frame 31 has three angularly spaced guide projections 31a disposed on the outer periphery thereof. The guide projections 31a are inserted into the linear guide grooves 3c of the movable frame 3. The second front lens group holding frame 31 is slidably supported on the inner periphery 6 of the movable frame 3. The second rear lens group holding frame 32 includes three angularly spaced guide projections 32a disposed on the outer periphery thereof. The guide projections 32a are inserted into the linear guide grooves 31b which are formed on the inner periphery of the second front lens group holding frame driven 31 at positions corresponding to the guide projections 32a. The second rear lens group holding driven frame 32 is slidably supported on the inner periphery of the second front lens group holding driven frame 31.

A differential cam 37 includes driving pins 37a fitted in the guide grooves 2a of the stationary frame 2, cam faces 37d abutting on the third lens holding driven frame 7 and abutments abutting on the cam stopper plate 9, which are formed similarly to those in the first embodiment. The second front lens holding driven frame 31 is provided with three projecting differential cam abutments 31c at the mount side end face thereof. The second rear lens holding driven frame 32 is also provided with three projecting differential cam abutments 32b at the mount side end face thereof. The differential cam 37 is provided with two cam faces 37b and 37c corresponding to the cam abutments 31c and 32b. The cam faces 37b and 37c are formed on the outer and inner end faces, respectively, so that the wall of the cam 37 seems to be double layered as shown in FIG. 5. The contour of the cam faces are predetermined so that the second front and rear lens groups 22 and 23 which are moved by following the cam faces are separated at a desired distance in connection with a zoom position. The biasing forces of the abutments 31c and 32b acting upon the cam faces 37b and 37c are exerted by the second holding frame spring 10 and the second rear holding frame spring 33, respectively. Focussing operation is performed by driving the focussing pin 35a secured to the second holding frame 35 against a focussing spring 36 by means of the focussing cam 15 as is similar to the first embodiment. The sectors 25 for the aperture and shutter are supported on the second holding frame 35 and are assured to be moved simultaneously with focussing.

Operation of the second embodiment of the thus formed lens-barrel assembly will be described. Description of the motion of the third lens holding driven frame 7 will be omitted since it is identical with that in the first embodiment. The second front lens group holding driven frame 31 which holds the second front lens group 22 and the second lens holding frame 32 which holds the second rear lens group 22 via the second holding frame 35 have respective differential cam abutments 31c and 32b which abut respectively on the cam faces 37b and 37c of the differential cam 37 having different contours. Therefore the holding frames 31 and 32 perform relatively different motions with respect to the movable frame 3 on rotation of the differential cam 37 so that the second front and rear lens groups 22 and 23 held on the respective frames are moved to respective predetermined positions.

Although the differential cam uses cam means formed on the end face of the cam frame in the first and second embodiments, this type of cam means may be replaced with groove or slot type cam means. This groove or slot tYpe cam means may be provided on the inner or outer periphery of the cam frame in the vicinity of the end thereof. If the cam face is of the inner face type cam, the compression springs may be replaced with tension springs. Although the movable frame 3 is extended and retracted by using helicoid screws in the above-mentioned embodiments, the present invention may be embodied by using an extending and retracting means including a cam groove and a driving follower pin. It is apparent that the present invention may be applicable to a zoom lens-barrel assembly in which focussing lens groups or lens groups which are moved by zooming operation are plural groups. That is, a plurality of lens holding frames which are cam-linked with a differential cam frame may be provided at each side of the differential cam frame.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A zoom lens-barrel assembly which performs zooming operation by moving forwardly and rearwardly a plurality of lens groups in a direction of an optical axis, comprising:

a stationary frame adapted to be mounted on a camera;

a movable frame which is moved in the direction of the optical axis relative to said stationary frame by zooming operation;

a cam frame which is cam linked with said stationary frame and may be rotated around the optical axis by being moved in the optical axis direction together with said movable frame; said cam frame having one circumferential cam at front and rear portions thereof, respectively;

first and second driven frames which are held by said movable frame so that they are movable along the optical axis and can not be rotated around the optical axis, the positions of said first and second driven frames with respect to said movable frame along the optical axis being determined by engaging with the cams at the front and rear portions of said cam frame, respectively; and a plurality of lens groups which are respectively held by said movable frame and first and second driven frames.

2. A zoom lens-barrel assembly as defined in claim 1, and further including a first spring means for biasing said first driven frame toward said cam frame and a second spring means for biasing said second driven frame toward said cam frame.

3. A zoom lens-barrel assembly as defined in claim 2, in which said first spring means is disposed between the front end of said movable frame and the first driven frame and said second spring means is disposed between the second driven frame and the rear end of said movable frame.

4. A zoom lens-barrel assembly as defined in claim 3 in which said cam frame is normally biased upon a cam frame stopper plate provided at the rear end of said movable frame.

5. A zoom lens-barrel assembly as defined in claim 4, in which said cam frame is formed with guide pins at the outer periphery thereof, said pins being slidably fitted in spiral slots provided along said stationary frame.

6. A zoom lens-barrel assembly as defined in claim 2, in which the biasing force of the first spring means is larger than that of the second spring means.

7. A zoom lens-barrel assembly as defined in claim 1, in which said first driven frame includes a supporting frame which is movable in the direction of the optical axis and supports a lens group of the plurality of lens groups.

8. A zoom lens-barrel assembly as defined in claim 7, in which the lens group supported by the supporting frame is a focussing lens group which effects focussing by moving in the direction of the optical axis relative to other lens groups.

9. A zoom lens-barrel assembly as defined in claim 1, in which said front cam of said cam frame includes a cam groove provided in the vicinity of the front end of the cam frame with which a cam follower provided on the first driven frame is cam-engaged.

10. A zoom lens-barrel assembly as defined in claim 1, in which said rear cam of said cam frame includes a cam groove provided in the vicinity of the rear end of the cam frame, with which a cam follower provided on the second driven frame is cam-engaged.

11. A zoom lens-barrel assembly as defined in claim 9 or 10, in which said cam groove is formed on the inner periphery of the cam frame.

12. A zoom lens-barrel assembly as defined in claim 1, in which said front cam includes a cam face on the front end face of said cam frame, upon which said first driven frame abuts.

13. A zoom lens-barrel assembly as defined in claim 1, in which said rear cam includes a cam face on the rear end face of said cam frame, upon which said second driven frame abuts.

14. A zoom lens-barrel assembly which performs zooming operation by moving forwardly and rearwardly a plurality of lens groups in a direction of an optical axis comprising:

a stationary frame adapted to be mounted on a camera;

a movable frame which is moved in the direction of the optical axis relative to said stationary frame by zooming operation;

a cam frame which is cam linked with said stationary frame and may be rotated around the optical axis by being moved in the optical axis direction together with said movable frame; said cam frame having two circumferential cams and one circumferential cam at front and rear portions thereof, respectively;

first, second and third driven frames which are held by said movable frame so that they are movable along the optical axis and cannot be rotated around the optical axis, the positions of said first and second driven frames relative to said movable frame in the direction of the optical axis being determined by engaging with the front and rear cams of said cam frame, respectively; and a plurality of lens groups which are held by said movable frame and said driven frames, respectively.

15. A zoom lens-barrel assembly as defined in claim 14, in which one of said front cams includes a cam face on the front end face of said cam frame, and the other front cam includes a cam groove formed on the inner periphery of the cam frame in the vicinity of the front end thereof.

16. A zoom lens-barrel assembly as defined in claim 14, in which said rear cam includes a cam face on the rear end face of the cam frame or a cam groove formed on the inner periphery of the cam frame in the vicinity of the rear end thereof.

17. A zoom lens-barrel assembly as defined in claim 14, in which both front cams include radially inner and outer cam faces on the front end face of the cam frame.

18. A zoom lens-barrel assembly as defined in claim 17, in which said first and second driven frames of said three driven frames abut on the inner and outer cam faces, respectively.

19. A zoom lens-barrel assembly as defined in claim 17, in which said second driven frame is within the first driven frame so that it is movable along the first driven frame in an axial direction.

20. A zoom lens-barrel assembly as defined in claim 17, in which said first and second driven frames are cylindrical in outer shape and concentric around the optical axis.

21. A zoom lens-barrel assembly as defined in claim 17, in which said first and second driven frames hold front and rear lens groups of an intermediate lens group of the plurality of lens groups, respectively.

22. A zoom lens-barrel assembly as defined in claim 21, in which said rear lens group of the intermediate lens group is held by said second driven frame via a holding frame which is movable in the direction of the optical axis.

23. A zoom lens-barrel assembly as defined in claim 21, in which an aperture is disposed between said front and rear lens groups of the intermediate lens group.

24. A zoom lens-barrel assembly as defined in claim 23, wherein said aperture is further comprised of a shutter provided with a plurality of sectors.

25. A zoom lens-barrel assembly as defined in claim 14, and further including a first spring for biasing said first driven frame toward said cam frame and a second spring for biasing the third driven frame toward said cam frame.

26. A zoom lens-barrel assembly as defined in claim 25, in which the biasing force of the first spring is larger than that of the second spring.

27. A zoom lens-barrel assembly as defined in claim 25, which a third spring is provided between the first and second driven frames for biasing the second driven frame toward said cam frame, the biasing force of the third spring being smaller than that of the second spring.

28. A zoom lens-barrel assembly which performs a zooming operation by moving forwardly and rearwardly a plurality of lens groups in a direction of an optical axis, comprising:
a stationary frame adapted to be mounted on a camera;
a movable frame which is moved in the direction of the optical axis relative to said stationary frame by said zooming operation:
a cam frame which is cam linked with said stationary frame and may be rotated around the optical axis by being moved in the optical axis direction together with said movable frame; said cam frame having a plurality of circumferential cams at respective front and rear portions thereof;
a plurality of driven frames which are held by said movable frame so that they are movable along the optical axis and cannot be rotated around the optical axis, the positions of said driven frames relative to said movable frame in the direction of the optical axis being determined by engagement with the front and rear cams of the said cam frame, respectively; and
a plurality of lens groups which are held by said movable frame and said driven frames, respectively.

29. A zoom lens-barrel assembly for performing a zooming operation by selectively moving a plurality of lens groups in the direction of an optical axis, comprising:
a stationary frame;
a movable frame slidably mounted within said stationary frame;
said stationary frame including means for slidably receiving said movable frame to permit said movable frame to experience linear movement and to prevent the movable frame from experiencing rotational movement;
first and second lens mounting frames slidably mounted within said movable frame;
said movable frame including means for permitting slidable movement of said first and second lens mounting frames to permit said lens mounting frames to experience linear movement while preventing said lens mounting frames from experiencing rotational movement;
differential cam means arranged within said movable frame and positioned between said lens mounting frames;
said differential cam means having first cam means adjacent said first lens mounting frame and second cam means adjacent said second lens mounting frame;
said first and second lens mounting frames having cam follower means respectively engaging said first and second cam means;
means for moving said movable frame relative to said stationary frame;
said stationary frame having spiral cam means;
said differential cam means having cam follower means engaging said spiral cam means whereby said differential cam means is rotated about said optical axis responsive to movement of said movable frame relative to said stationary frame;
the distance between said first and second lens mounting frames being determined by the angular orientation of said differential cam means.

30. A zoom lens-barrel assembly according to claim 29, further comprising bias means for urging and maintaining each of said cam follower means in engagement with its associated cam means.

31. A zoom lens-barrel assembly according to claim 29, further comprising a third lens mounting frame slidably mounted within said first lens mounting frame;
said first lens mounting frame including means for permitting linear sliding movement of said third lens mounting frame while preventing rotation of said third lens mounting frame;
said differential cam means further comprising third cam means adjacent said third lens mounting frame;
said third lens mounting frame having cam follower means engaging said third cam means whereby the linear position of said third lens mounting frame within said barrel assembly is determined by the angular orientation of said differential cam means.

32. A zoom lens-barrel assembly as defined in claim 29, further comprising a zoom ring surrounding said stationary frame, said zoom ring having an internal helicoid;
said movable frame having a plurality of segments arranged at spaced intervals about the outer periphery thereof;
said stationary frame having elongated slots, each of said segments extending through and slidable along an associated one of said elongated slots;
the surface of each of said segments extending through said slots having a helicoid which meshes with the helicoid of said zoom ring, whereby rotation of said zoom ring is converted into linear movement of said movable frame by said internal helicoid.

33. A zoom lens-barrel assembly according to claim 29, further comprising encoder means including an encoding pattern arranged on the periphery of said zoom ring;
encoder contacts supported on said stationary frame and slidably engaging said encoding pattern for providing position information.

* * * * *

UNITED STATES PATENT AND TRADEMARK OFFICE
CERTIFICATE OF CORRECTION

PATENT NO. : 4,993,815
DATED : February 19, 1991
INVENTOR(S) : Yamazaki et al.

It is certified that error appears in the above-identified patent and that said Letters Patent is hereby corrected as shown below:

Column 1, line 28, "an" should be --and--

Column 6, line 51, after "is" insert --stopped via the differential cam ball 18 by means of the--

Column 9, line 8, change "roar" to --rear--

Column 11, line 16, before "which" insert --in--

Signed and Sealed this

Sixth Day of October, 1992

Attest:

DOUGLAS B. COMER

Attesting Officer     Acting Commissioner of Patents and Trademarks